Figure 1:
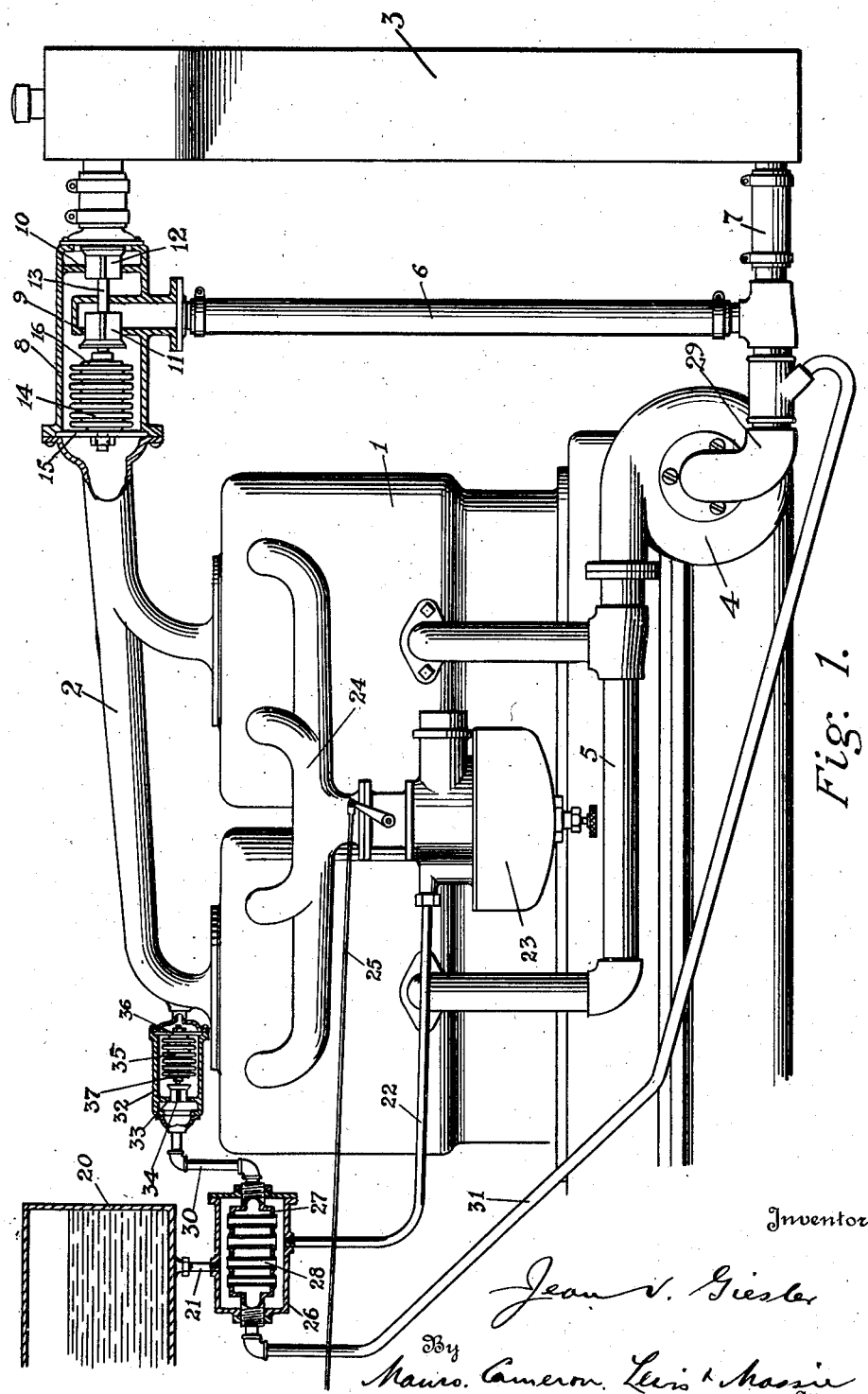

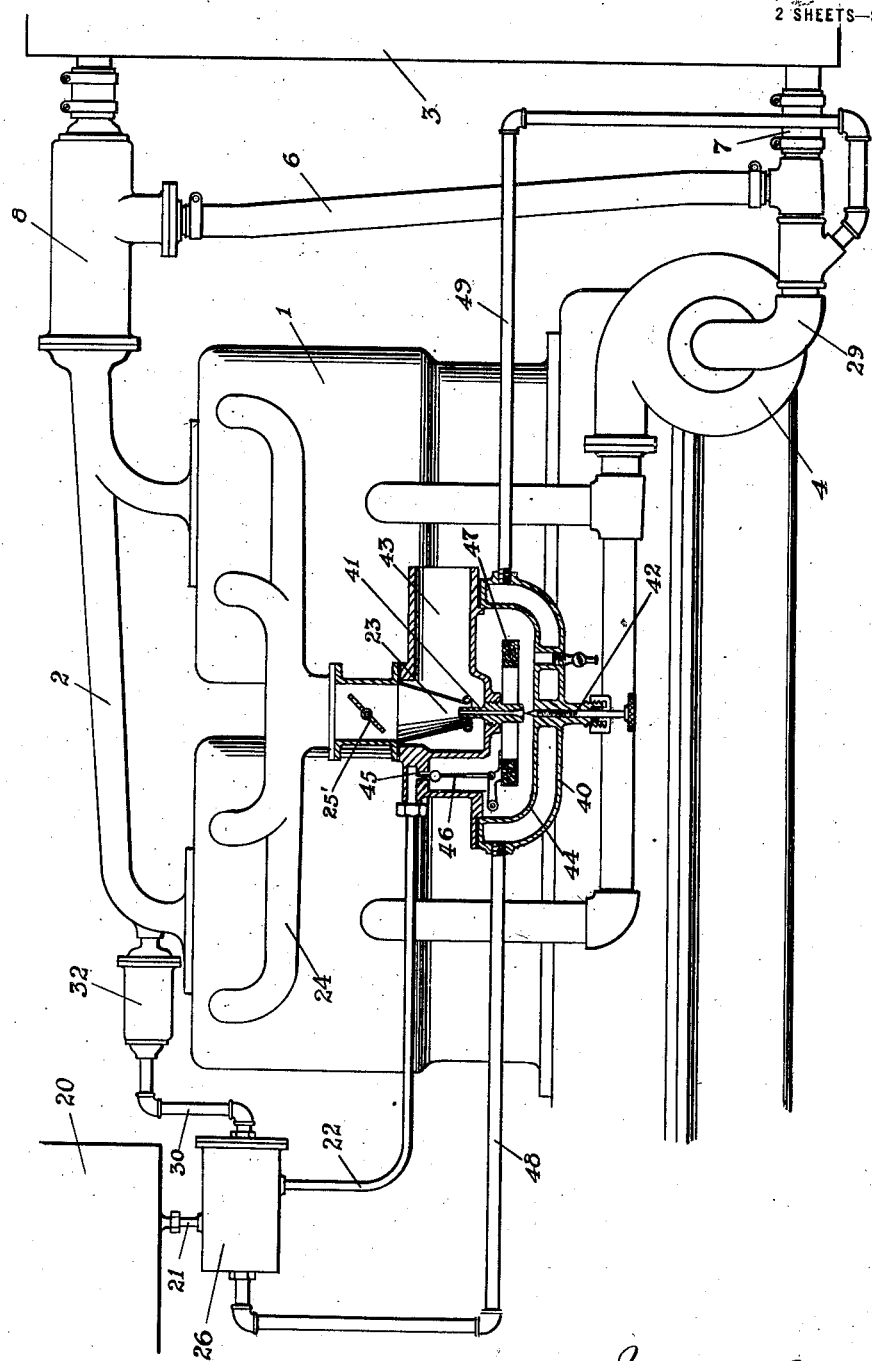

UNITED STATES PATENT OFFICE.

JEAN V. GIESLER, OF KNOXVILLE, TENNESSEE, ASSIGNOR TO THE FULTON COMPANY, OF KNOXVILLE, TENNESSEE, A CORPORATION OF MAINE.

FUEL-HEATING SYSTEM.

1,300,600.  Specification of Letters Patent.  Patented Apr. 15, 1919.

Application filed October 16, 1916. Serial No. 125,894.

*To all whom it may concern:*

Be it known that I, JEAN V. GIESLER, a citizen of the United States of America, and a resident of Knoxville, Tennessee, have invented a new and useful Improvement in Fuel-Heating Systems, which invention is fully set forth in the following specification.

This invention relates to internal-combustion engines and, while of utility when employed with any engine of this type, is particularly designed as an improvement in internal-combustion engines wherein a cooling medium is circulated in heat-interchanging relation to the engine.
It has heretofore been proposed to utilize the exhaust gases of the engine and also a cooling medium circulated in heat-interchanging relation to the engine for preheating the fuel prior to its delivery to the engine cylinders. Previous structures of this type, however, have had serious disadvantages, one of the more notable of which was the lack of proper control or uniformity in the heating of the fuel. The viscosity of the fuel varies with the temperature, and, therefore, its rate of flow depends in some degree upon the amount of heat delivered to the same. Accordingly, there was a tendency in systems heretofore known for the rate of fuel supply to vary within wide limits under various working conditions of the engine.

It is an object of this invention to provide a fuel heating system for an internal combustion engine that obviates the above and other disadvantages and wherein the temperature of the fuel is maintained substantially constant.

Another object of this invention is to provide a fuel heating system for internal combustion engines which enables the use of low grade fuels, which increases the efficiency of the engine by supplying to the fuel heat heretofore lost, and which is simple in construction, inexpensive to manufacture and install, and efficient in operation.

Stated briefly, the invention comprises, in combination with an internal combustion engine, means for supplying liquid fuel thereto, and means for preheating said fuel prior to its delivery to the engine, said last-named means preferably comprising a by-pass in the system for circulating a cooling medium in heat interchanging relation to the engine and shown as comprising a separate heater for the liquid fuel or a heating-jacket for the fuel reservoir of the carbureter, or both, as may be desired. Means are furthermore provided for regulating the temperature of the cooling medium flowing through the system for circulating the same in heat-interchanging relation to the engine, to the end that said medium shall be maintained at a substantially uniform temperature. Also thermosensitive means are preferably provided for closing said by-pass upon the temperature of the fuel reaching a predetermined maximum degree, said last-named means being disclosed as constructed to assume a safety position upon failure of the temperature control.

The invention is capable of receiving a variety of mechanical expressions, two of which for purposes of illustration have been shown on the accompanying drawings; but it is to be expressly understood that these embodiments of the invention have been selected for purposes of illustration only, and are not to be construed as definitive of the limits of the invention, reference being had to the appended claims for that purpose.

Referring to the drawings, wherein the same reference characters designate corresponding parts in the several figures, Figure 1 is an elevation, partly in section of one embodiment of the invention;

Fig. 2 is an elevation, partly in section of a modified embodiment of the invention.

Referring in detail to Fig. 1, 1 represents an internal combustion engine of any preferred type, the same being provided with a jacket through which it is designed a cooling medium for the engine shall be circulated in heat interchanging relation to said engine. 2 represents the manifold through which the cooling medium flows from the engine jackets, 3 any suitable form of radiator, 4 any suitable form of circulating pump for withdrawing the cooling medium from the radiator and delivering the same to the engine jackets, and 5 the manifold through which the cooling medium returns to said jackets. While the invention has been illustrated as embodied in a system for circulating a cooling medium comprising a circulating pump, it is to be understood that the invention may be embodied with equal facility in a system employing the thermosiphon system of circulation.

Means are provided for regulating the temperature of the cooling medium, shown as means for regulating the flow of cooling medium through the system, although other means for performing this function might be employed with equal facility. While any suitable mechanism for regulating the flow of the cooling medium may be employed, a preferred construction comprises a by-pass 6 between the manifold 2 and the conduit 7 intermediate the radiator and circulating pump, and means for directing the flow of said cooling medium through either the radiator or the by-pass, or both, as the temperature needs of the cooling medium may determine. In the construction illustrated on the drawing, a valve-housing 8 is provided intermediate the manifold 2 and the radiator 3, from which valve-housing leads the by-pass 6. Within the valve-housing 8 are provided two ports 9 and 10 controlled by valve members 11 and 12 respectively. The port 9 with its valve member 11 controls the flow of the cooling medium from the valve-housing into the by-pass 6, while the port 10 with its valve member 12 controls the flow of the cooling medium from the valve-housing into the radiator 3. Said valve members 11 and 12 may be of any suitable type, being illustrated as well-known forms of seating valves, and are preferably connected by an integral valve-stem 13 whereby they are caused to move in unison. In the form shown said valve members are under the control of thermosensitive means of any suitable construction that is subjected to the cooling medium, whereby the proportionate flow of such medium through the radiator and by-pass is directly determined by the temperature of this medium. To this end an expansible and contractible vessel 14, preferably constructed of corrugated resilient metal, such as brass, is shown as having one end rigidly mounted in the valve housing by the bracket 15 and having its opposite and movable end wall 16 connected with the valve members 11 and 12. Vessel 14 is charged with a thermosensitive fluid preferably at a pressure below that to which the vessel is exteriorly subjected, whereby under normal working conditions said vessel is somewhat contracted by the exterior pressure thereon. Vessel 14, when fully expanded, closes valve 11 and opens valve 12. Should vessel 14 leak, therefore, the pressure within and without the same becomes equalized and the resiliency inherent in its wall causes expansion of the vessel, closing valve 11 and opening valve 12.

Any suitable means for supplying fuel to the engine may be employed. In the embodiment illustrated on the drawing, 20 represents a fuel-supply tank. This tank may be either the main storage tank used in connection with a gravity supply system, or it may be an intermediate tank in any preferred form of vacuum or pressure fuel feed system. From tank 20 the fuel is supplied to the engine cylinders through pipes 21 and 22, carburetor 23 and the intake manifold 24, any suitable form of throttle valve being employed intermediate the carburetor and the intake manifold, its operating mechanism being illustrated at 25. In accordance with one embodiment of this invention, a heater for the fuel is interposed between the pipes 21 and 22. Any suitable form of heater may be employed, the illustrated construction comprising a casing 26 within which is positioned a second and similar casing 27 intersected by a plurality of tubes 28. The fuel may pass around the exterior of the casing 27 as well as through the tubes 28. Means are provided for supplying a heating medium to this heater, such heating medium preferably being the cooling medium circulated in heat-interchanging relation to the engine in its heated condition as it leaves the engine cylinders. To this end a by-pass is shown as provided between the manifold 2 and the inlet 29 of the circulating pump, said by-pass comprising pipe 30 communicating at one end with the manifold 2 and at its opposite end with the interior of the casing 27, and a second pipe 31 communicating at one end with the interior of the casing 27 and at its opposite end with the intake of the circulating pump. Thereby cooling medium in its heated condition, as it flows from heat-interchanging relation to the engine, passes through the casing 27, surrounding the tubes 28 and delivering its heat to the fuel as it passes through said tubes and around the exterior of the casing 27. From the latter casing the cooling medium returns to the circulating pump 4.

Under normal working conditions the temperature of the cooling medium flowing through the system will be maintained substantially constant, whereby the fuel will be preheated to a substantially constant temperature before it is supplied to the carburetor. To positively prevent overheating of the fuel under abnormal conditions, it is desirable to provide means controlling the flow of the heating medium through the by-pass heretofore described, such means preferably taking the form of a thermosensitively controlled valve. In the form shown the thermosensitive member for operating said valve is shown as subjected to the said medium as it flows through the by-pass, but this thermosensitive member could be, if desired, and in some cases preferably is, exposed directly to the fuel. In the illustrated embodiment of the invention, a casing 32 is interposed in the by-pass between the manifold 2 and the pipe 30, such casing being provided interiorly with a port 33 controlled by a valve member 34. Port 33 and valve member 34 control the flow of heating medium through the by-pass. While any suitable form of valve may be employed, a well-known type of seating valve has been illustrated. Thermosensitive means of any suitable construction are provided for controlling said valve 34, such means in the preferred embodiment of the invention comprising an expansible and contractible vessel 35 preferably of corrugated resilient metal, such as brass, fixedly mounted at one end in the casing 32 by a bracket 36 and having at its opposite end a movable end-wall 37 connected with valve member 34. Vessel 35 is charged with a thermosensitive fluid, preferably at a pressure below that to which the vessel is normally exteriorly subjected. Thereby is the vessel, under normal conditions, somewhat contracted. When this vessel is fully expanded, however, valve 34 is closed. Should the vessel leak, therefore, the pressure within and without the same becomes equalized, whereby said vessel, owing to the resiliency inherent in its wall, expands to close valve 34.

Referring in detail to Fig. 2, a modified embodiment of the invention is illustrated wherein the heater takes the form of a jacket 40 for the fuel reservoir of the carbureter 23. Said carbureter may be of any suitable construction, that illustrated comprising a nozzle 41, a needle valve 42 and an air intake 43. Fuel is supplied to the reservoir 44 through a port 45 communicating with pipe 22, and port 45 is controlled by a needle valve 46 actuated by a float 47. 25' illustrates the usual throttle valve. The heating medium, i. e., the cooling medium in its heated condition as it flows from heat interchanging relation to the engine, is passed through the jacket 40 of the carbureter, pipes 48 and 49, communicating respectively with the manifold 2 and the pump 4; being tapped into opposed portions of the jacket 40. Pipe 48 may communicate directly with valve-housing 32, or a heater for the fuel may be interposed in the system between the tank 20 and the carbureter, as illustrated on the drawing.

In operation, in both embodiments fuel is supplied the engine cylinders from tank 20, flowing through pipes 21 and 22, the carbureter 23, and intake manifold 24 into the engine cylinders. When the engine is first started, the coooling medium flowing through the engine jackets will be relatively cold, vessel 14 will be contracted, valve 11 will be wide open and valve 12 entirely closed. The cooling medium will flow from manifold 2 through by-pass 6 back to the jackets. As the temperature of the engine rises, the temperature of the cooling medium will correspondingly rise, and eventually vessel 14 will begin to expand, proportionately closing valve 12 and opening valve 11, whereby some of the cooling medium will be directed through the radiator 3. Vessel 14 will thereafter move valves 11 and 12 until it proportions the flow of cooling medium through the radiator and by-pass so as to maintain a substantially uniform temperature of said cooling medium. Some of said cooling medium in its heated condition, as it flows from heat-interchanging relation to the engine, will flow through the by-pass provided by casing 32, pipe 30, casing 27, and pipe 31 in Fig. 1, or casing 32, pipe 30, casing 27 (if provided), pipe 48, jacket 40 and pipe 49 in Fig. 2. This medium as it flows through the casing 27 will give up some of its heat to the fuel as it passes around the said casing and through the tubes 28 in the embodiment of Fig. 1, and give up some of its heat to the fuel as it flows through the carbureter, if a jacket therefor be included in the system as illustrated in Fig. 2. If, for any reason, the temperature of the medium flowing through the by-pass should rise above a predetermined degree so as to produce a liability of the fuel boiling, vessel 35 will expand, closing valve 34 and preventing further flow of heating medium through the by-pass until the temperature thereof has decreased to the requisite extent.

Should either of the vessels 14 or 35 leak, whereby there is a failure of the temperature control, said vessels, owing to the resiliency inherent in the same, will become fully expanded upon equalization of the pressure within and without the same, moving their connected valve members to positions of safety, i. e., directing all of the cooling medium through the radiator in the one case, and preventing flow of the heating medium through the heater or carbureter jacket, or both, in the other case.

While this invention has been described as embodied in a system employing a cooling medium for the engine cylinders as a heating medium for the fuel, it will be understood that the invention in all its features is not restricted to such an embodiment, but that certain features thereof are of equal utility when applied to the use of the exhaust gases of the engine as a heating medium for the fuel. The invention is not to be restricted to the embodiments illustrated on the drawings, as other embodiments will readily suggest themselves to those skilled in the art, while certain parts thereof are capable of use without other parts thereof. The limits of the invention are accordingly to be determined by reference to the claims hereto appended.

What is claimed is:

1. In combination with an internal-combustion engine, means for supplying said engine with liquid fuel, means for circulating a cooling medium in heat-interchanging relation to said engine, means for circulating said medium in its heated condition in heat-interchanging relation to said fuel-supplying means, and thermosensitively controlled means for regulating the temperature of said cooling medium.

2. In combination with an internal-combustion engine, a system for circulating a cooling medium in heat-interchanging relation to said engine, a heater connected into said system and through which liquid fuel for said engine is passed, and thermosensitively controlled means for regulating the temperature of said cooling medium.

3. In combination with an internal-combustion engine and its carbureter, means for circulating a cooling medium in heat-interchanging relation to said engine, means for circulating said medium in its heated condition in heat-interchanging relation to the fuel reservoir of said carbureter, and thermosensitively controlled means for regulating the temperature of said cooling medium.

4. In combination with an internal-combustion engine and its carbureter, a heater for the liquid fuel of said engine, a system for circulating a cooling medium in heat-interchanging relation to said engine, means for circulating said medium in its heated condition in heat-interchanging relation to said heater and carbureter, and thermosensitively controlled means for regulating the temperature of said cooling medium.

5. In combination with an internal-combustion engine, a heater for the liquid fuel thereof, a system for circulating a cooling medium in heat-interchanging relation to said engine, a by-pass including said heater and through which said medium in its heated condition is passed, and thermosensitively controlled means for regulating the temperature of said cooling medium.

6. In combination with an internal-combustion engine and its carbureter, a jacket for the fuel reservoir of said carbureter, a system for circulating a cooling medium in heat-interchanging relation to said engine, a by-pass including said carbureter-jacket and through which said medium in its heated condition is passed, and thermosensitively controlled means for regulating the temperature of said cooling medium.

7. In combination with an internal-combustion engine and its carbureter, a jacket for the fuel reservoir of said carbureter, a heater for the liquid fuel of said engine, a system for circulating a cooling medium in heat-interchanging relation to said engine, a by-pass including said heater and carbureter-jacket and through which said medium in its heated condition is passed, and thermosensitively controlled means for regulating the temperature of said cooling medium.

8. In combination with an internal-combustion engine, a heater for the fuel thereof, a system for circulating a cooling medium in heat-interchanging relation to said engine, a by-pass including said heater and through which said medium in its heated condition is passed, thermosensitively controlled means for regulating the temperature of the cooling medium flowing through said system, and thermosensitively controlled means for regulating the flow of said medium through said by-pass.

9. In combination with an internal-combustion engine, a heater for the fuel thereof, a system for circulating a cooling medium in heat-interchanging relation to said engine, a by-pass including said heater and through which said medium in its heated condition is passed, thermosensitively controlled means for regulating the temperature of the cooling medium flowing through said system, and thermosensitive means controlled by the temperature of the medium flowing through said by-pass for regulating the flow of said medium through said by-pass.

10. In combination with an internal-combustion engine and its carbureter, a jacket for said carbureter, a system for circulating a cooling medium in heat-interchanging relation to said engine, a by-pass including said carbureter-jacket and through which said medium in its heated condition is passed, thermosensitively controlled means for regulating the temperature of the cooling medium flowing through said system, and thermosentitively controlled means for regulating the flow of said medium through said by-pass.

11. In combination with an internal-combustion engine and its carbureter, a jacket for said carbureter, a system for circulating a cooling medium in heat-interchanging relation to said engine, a by-pass including said carbureter-jacket and through which said medium in its heated condition is passed, thermosentitively controlled means for regulating the temperature of the cooling medium flowing through said system, and thermosensitive means controlled by the temperature of the medium flowing through said by-pass for regulating the flow of said medium through said by-pass.

12. In combination with an internal-combustion engine and its carbureter, a jacket for said carbureter, a heater for the fuel of said engine, a system for circulating a cooling medium in heat-interchanging relation to said engine, a by-pass including said carbureter-jacket and heater and through which said medium in its heated condition is passed, thermosensitively controlled means for regulating the temperature of the cooling medium flowing through said system, and thermosensitively controlled means for regulating the flow of said medium through said by-pass.

13. In combination with an internal combustion engine and its carbureter, a jacket for said carbureter, a heater for the fuel of said engine, a system for circulating a cooling medium in heat-interchanging relation to said engine, a by-pass including said carbureter-jacket and heater and through which said medium in its heated condition is passed, thermosensitively controlled means for regulating the temperature of the cooling medium flowing through said system, and thermosensitive means controlled by the temperature of the medium flowing through said by-pass for regulating the flow of said medium through said by-pass.

14. In combination with an internal-combustion engine, a heater for the fuel thereof, a system for circulating a cooling medium in heat-interchanging relation to said engine, a by-pass including said heater and through which said medium in its heated condition is passed, and thermosensitive means controlled by the temperature of the medium flowing through said by-pass for regulating the flow of said medium through the same.

15. In combination with an internal-combustion engine and its carbureter, a jacket for said carbureter, a system for circulating a cooling medium in heat-interchanging relation to said engine, a by-pass including said carbureter-jacket and through which said medium in its heated condition is passed, and thermosensitive means controlled by the temperature of the medium flowing through said by-pass for regulating the flow of said medium through the same.

16. In combination with an internal-combustion engine and its carbureter, a jacket for said carbureter, a heater for the fuel of said engine, a system for circulating a cooling medium in heat-interchanging relation to said engine, a by-pass including said carbureter-jacket and heater and through which said medium in its heated condition is passed, and thermosensitive means controlled by the temperature of the medium flowing through said by-pass for regulating the flow of said medium through the same.

17. In combination with an internal-combustion engine, a heater for the liquid fuel thereof, means for circulating a heating medium through said heater, means controlling the flow of heating medium through said heater, and means automatically controlled by the temperature of the medium flowing through said heater for operating said controlling means.

18. In combination with an internal-combustion engine and its carbureter, a jacket for the fuel reservoir of said carbureter, means for circulating a heating medium through said carbureter-jacket, means controlling the flow of heating medium through said carbureter-jacket, and means automatically controlled by the temperature of the medium flowing through said carbureter-jacket for operating said controlling means.

19. In combination with an internal-combustion engine and its carbureter, a jacket for the fuel reservoir of said carbureter, a heater for the liquid fuel of said engine, means for circulating a heating medium through said heater and carbureter-jacket, means controlling the flow of heating medium through said heater and carbureter-jacket, and means automatically controlled by the temperature of the medium flowing through said heater and carbureter-jacket for operating said controlling means.

20. In combination with an internal combustion engine, means for supplying said engine with liquid fuel, means for circulating a heating medium in heat-interchanging relation to said fuel-supplying means, and thermosensitive means controlled by the temperature of said medium for regulating the flow thereof in heat-interchanging relation to said fuel-supplying means.

21. In combination with an internal-combustion engine and its carbureter, a jacket for said carbureter, a system for circulating a cooling medium in heat-interchanging relation to said engine, a by-pass including said carbureter-jacket and through which said medium in its heated condition is passed, and thermosensitively-controlled means for regulating the flow of said medium through said by-pass.

22. In combination with an internal-combustion engine and its carbureter, a jacket for the fuel reservoir of said carbureter, means for circulating a heating medium through said carbureter-jacket, means controlling the flow of heating medium through said carbureter-jacket, and thermosensitive means for operating said controlling means.

23. In combination with an internal-combustion engine, means for supplying said engine with fuel, means for circulating a cooling medium in heat-interchanging relation to said engine, a by-pass for circulating said medium in its heated condition in heat-interchanging relation to said fuel-supplying means, a valve in said by-pass, and a thermostat for operating said valve, said thermostat being so constructed as to close said valve upon failure of the temperature control.

24. In combination with an internal-combustion engine, means for supplying said engine with fuel, means for circulating a heating medium in heat-interchanging relation with said fuel-supplying means, a valve controlling said circulating means, and a thermostat for operating said valve, said thermostat being so constructed as to close said valve upon failure of the temperature control.

25. In combination with an internal-combustion engine, a heater through which the liquid fuel for said engine is passed, a system for circulating a cooling medium in heat-interchanging relation to said engine, means for circulating said medium in its heated condition through said heater, and thermosensitively-controlled means for maintaining said medium in its heated condition at a substantially uniform temperature.

26. In combination with an internal-combustion engine, a heater through which the liquid fuel for said engine is passed, means for circulating a heating medium through said heater, and thermosensitively controlled means for maintaining said heating medium at a substantially uniform temperature.

In testimony whereof I have signed this specification.

JEAN V. GIESLER.